(12) United States Patent
Kim et al.

(10) Patent No.: US 9,409,362 B2
(45) Date of Patent: *Aug. 9, 2016

(54) GOLF BALL MOLDS AND RELATED SYSTEMS

(71) Applicant: Taylor Made Golf Company, Inc., Carlsbad, CA (US)

(72) Inventors: Hyun J. Kim, Carlsbad, CA (US); Jaerim Kim, San Diego, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 555 days.

This patent is subject to a terminal disclaimer.

(21) Appl. No.: 13/802,287

(22) Filed: Mar. 13, 2013

(65) Prior Publication Data

US 2014/0077414 A1   Mar. 20, 2014

Related U.S. Application Data

(60) Provisional application No. 61/702,675, filed on Sep. 18, 2012.

(51) Int. Cl.
| | | |
|---|---|---|
| *B29C 45/14* | (2006.01) | |
| *B29C 45/27* | (2006.01) | |
| *B29D 99/00* | (2010.01) | |
| *B29L 31/54* | (2006.01) | |

(52) U.S. Cl.
CPC ...... *B29D 99/0042* (2013.01); *B29C 45/14819* (2013.01); *B29C 45/2708* (2013.01); *B29C 45/14073* (2013.01); *B29L 2031/546* (2013.01)

(58) Field of Classification Search
CPC .............. B29C 45/14073; B29C 2045/14081; B29C 45/14819; B29C 45/2708; B29C 45/2735; B29L 2031/546; B29D 99/0042
USPC ............................................. 425/116, 129.1
See application file for complete search history.

(56) References Cited

U.S. PATENT DOCUMENTS

| | | | | |
|---|---|---|---|---|
| 2,076,412 | A * | 4/1937 | Oldham | ............ B29C 45/14819 264/275 |
| 2,178,774 | A * | 11/1939 | Bogoslowsky | ....... B29C 33/126 264/278 |
| 2,203,377 | A * | 6/1940 | Young | ................ B29D 99/0042 156/161 |
| 3,068,522 | A * | 12/1962 | Nickerson | ............. B29C 33/424 264/275 |
| 3,264,272 | A | 8/1966 | Rees | |
| 3,287,767 | A * | 11/1966 | Ford | ........................ B29C 33/12 249/83 |
| 3,359,249 | A * | 12/1967 | Kleiner | ...................... C08F 2/02 522/182 |
| 3,492,245 | A | 1/1970 | Calderon et al. | |
| 3,804,803 | A | 4/1974 | Streck et al. | |
| 5,827,548 | A * | 10/1998 | Lavallee | ........... B29C 45/14073 264/275 |
| 6,093,360 | A * | 7/2000 | Inoue | ................ B29C 45/14819 264/278 |
| 6,100,321 | A | 8/2000 | Chen | |
| 6,190,597 | B1 * | 2/2001 | Inoue | ................. A63B 37/0003 264/275 |
| 6,319,451 | B1 * | 11/2001 | Brune | ............... B29C 45/14073 264/275 |
| 6,329,458 | B1 | 12/2001 | Takesue et al. | |

(Continued)

*Primary Examiner* — Robert B Davis
(74) *Attorney, Agent, or Firm* — Klarquist Sparkman, LLP

(57) ABSTRACT

Golf balls and systems for applying one or more polymer layers to a golf ball construct are disclosed. As but one example of disclosed systems, a method of forming a golf ball construct includes positioning a core or mantle portion of a golf ball in a cavity, opening a valve gate adjacent the cavity to cause viscous polymer to flow through the valve gate, into a short runner and into one or more radial runners that at least partially surround a circumference of the cavity. The polymer layer is allowed to solidify to form a solidified polymer layer, and the golf ball construct is removed from the mold cavity.

11 Claims, 7 Drawing Sheets

(56) References Cited

U.S. PATENT DOCUMENTS

| | | | |
|---|---|---|---|
| 6,358,031 B1 * | 3/2002 | Kikuchi | B29C 45/7312 249/79 |
| 6,562,906 B2 | 5/2003 | Chen | |
| 6,616,552 B2 | 9/2003 | Takesue et al. | |
| 6,641,771 B1 * | 11/2003 | Sano | B29C 45/14073 264/278 |
| 6,861,474 B2 | 3/2005 | Kim | |
| 6,924,337 B2 | 8/2005 | Kim et al. | |
| 6,930,150 B2 | 8/2005 | Kim | |
| 6,939,924 B2 | 9/2005 | Kim et al. | |
| 7,037,985 B2 | 5/2006 | Kim et al. | |
| 7,528,196 B2 | 5/2009 | Kim et al. | |
| 7,879,968 B2 | 2/2011 | Kim et al. | |
| 2003/0158312 A1 | 8/2003 | Chen | |
| 2003/0224871 A1 | 12/2003 | Kim et al. | |
| 2005/0098925 A1 * | 5/2005 | Puniello | B29C 45/14073 264/328.1 |
| 2006/0093702 A1 * | 5/2006 | Andersen | B29C 45/14073 425/556 |
| 2009/0209367 A1 | 8/2009 | Stefan et al. | |
| 2011/0130216 A1 | 6/2011 | Kim et al. | |
| 2014/0183786 A1 * | 7/2014 | Kim | A63B 37/0075 264/278 |

\* cited by examiner

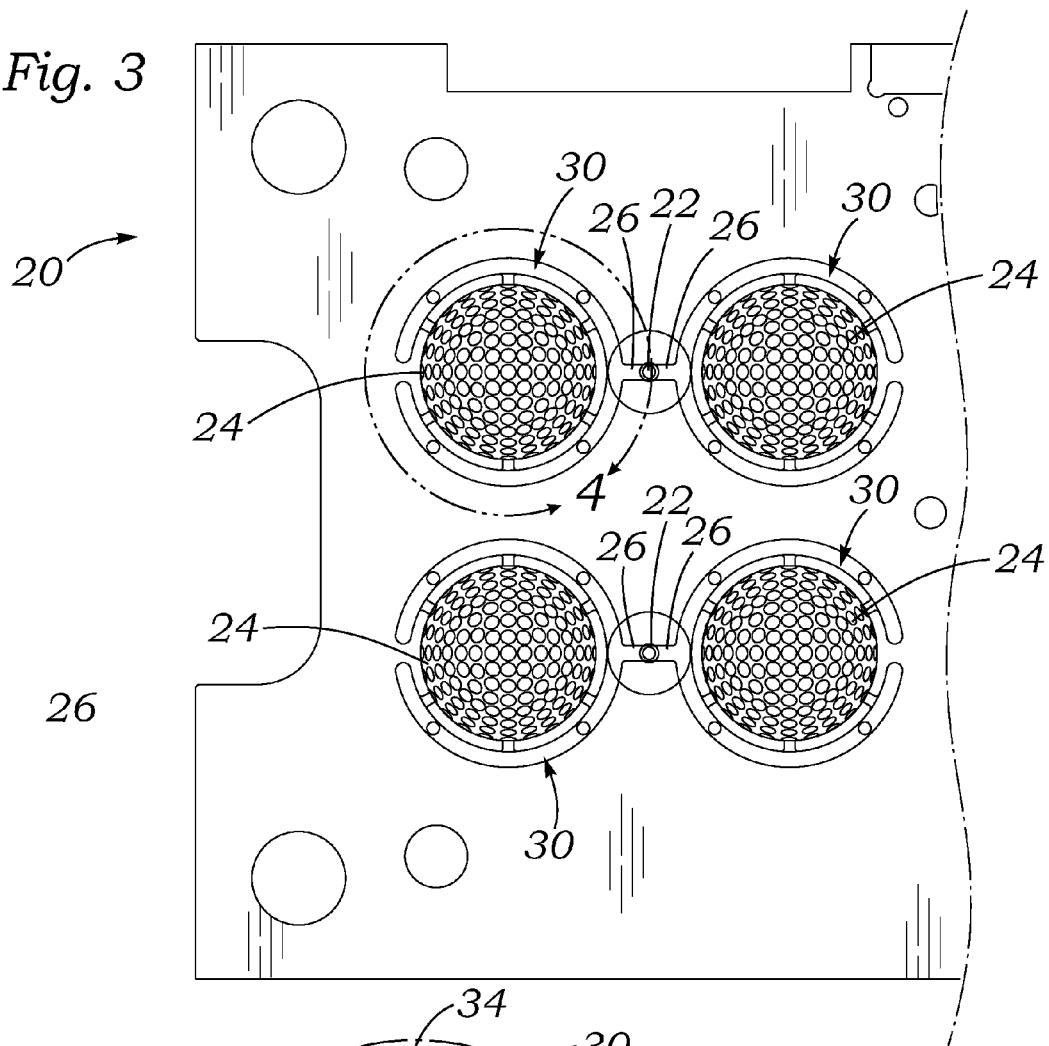
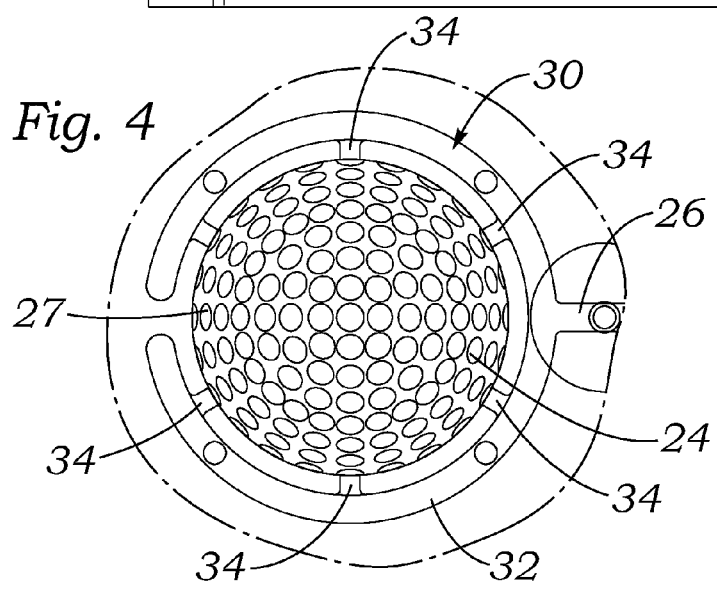

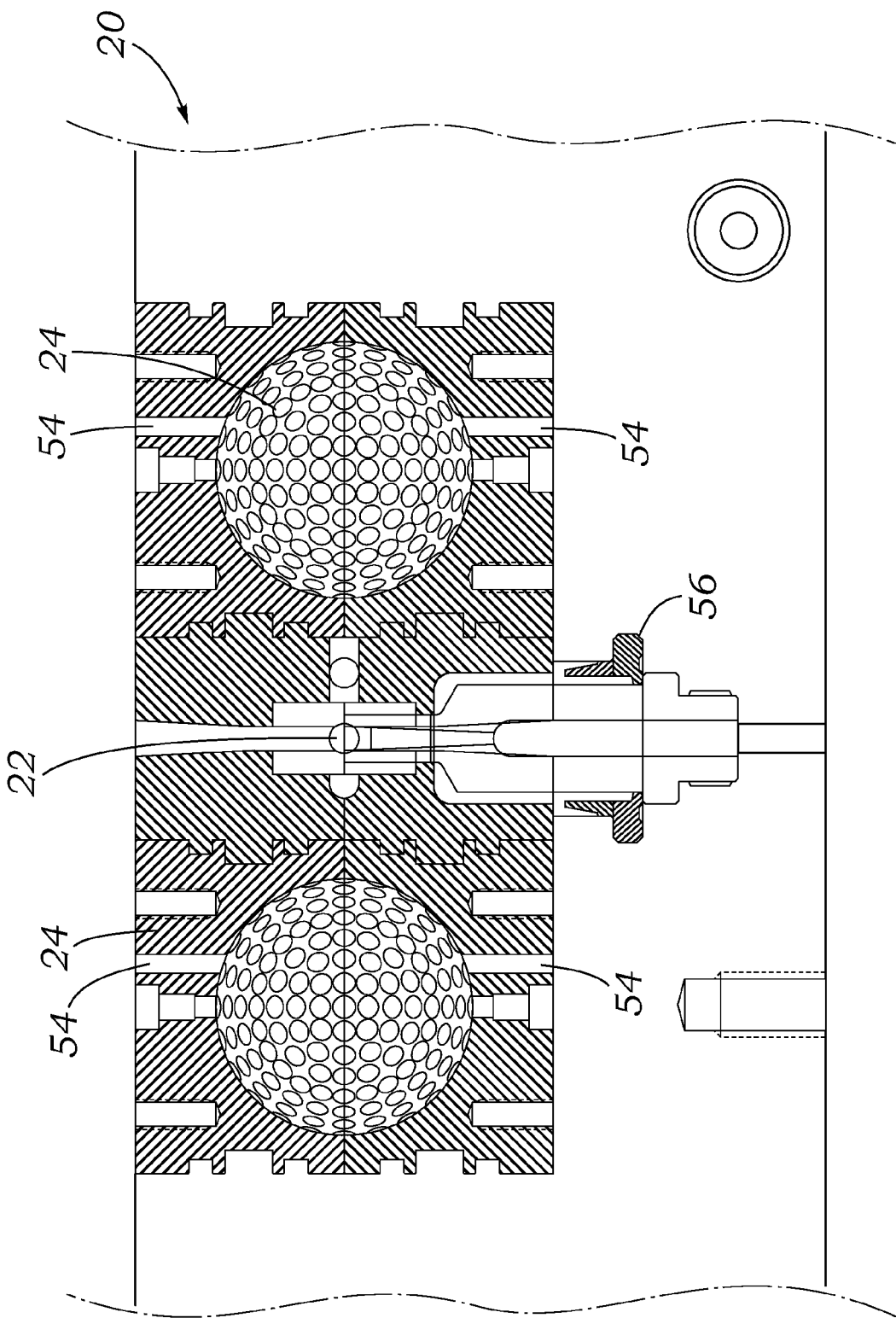

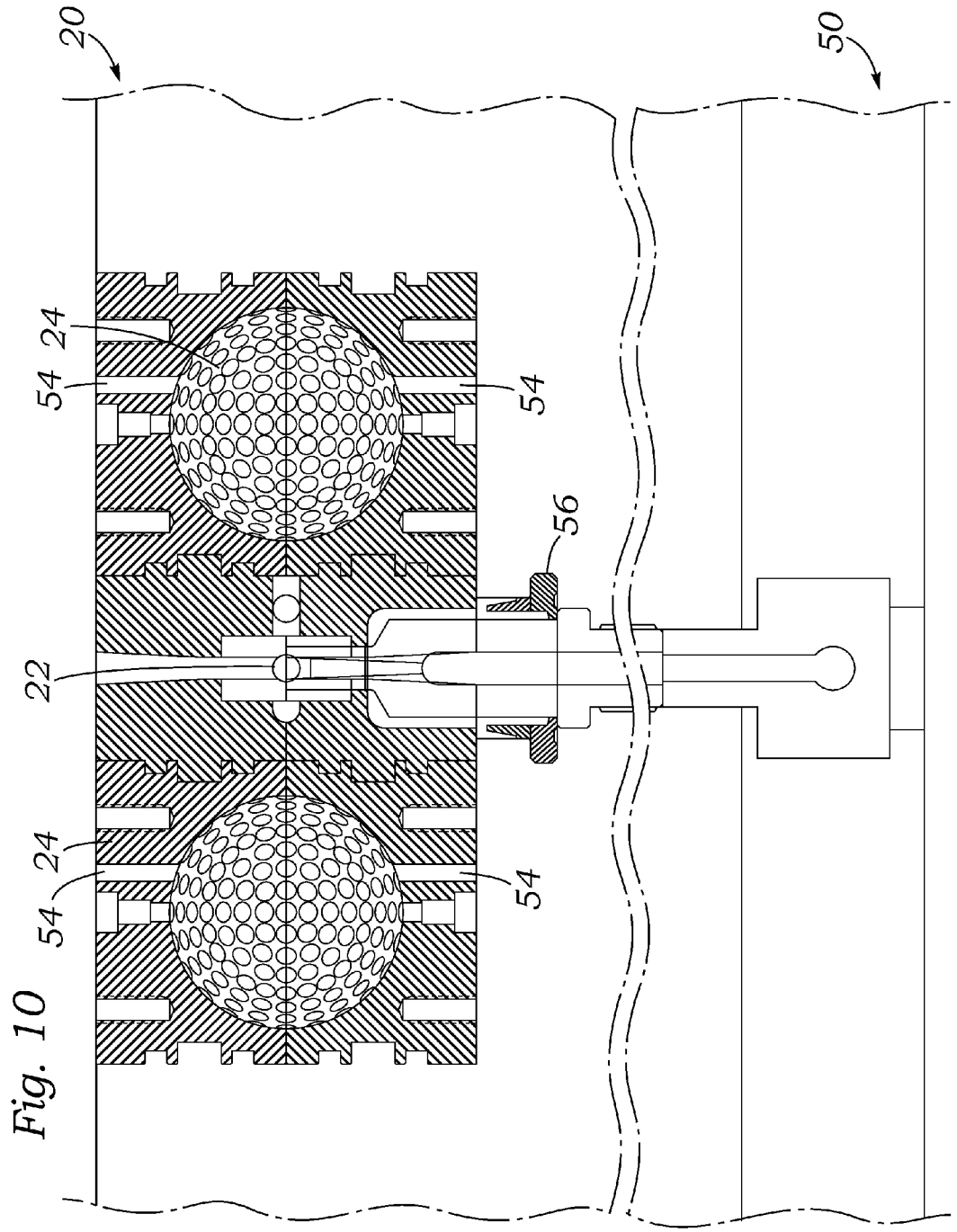

GOLF BALL MOLDS AND RELATED SYSTEMS

CROSS REFERENCE TO RELATED APPLICATION

This application claims the benefit of U.S. Provisional Application No. 61/702,675, which was filed on Sep. 18, 2012 and is incorporated herein by reference in its entirety.

FIELD

This disclosure concerns golf balls, and more particularly, methods and apparatus for applying one or more polymers to a golf ball construct.

BACKGROUND

Some golf balls comprise a core and an outer cover comprising a polymer layer. A polymer layer of a golf ball can be applied using an injection molding process. In such a process, a golf ball core is typically retained by core pins within a mold cavity, and polymer is injected into an open volume between walls of the cavity and the golf ball core, thereby forming the polymer layer. Conventional injection molding methods use sprue and runner systems to deliver the polymer to the cavity form the outer cover. Because the outer cover of the golf ball itself is relatively thin, the sprue and runner systems are generally the thickest part of the mold and, as a result, require the longest cooling times. Accordingly, the required cooling times for mold cycles are often limited by the amount of time required to cool material that will ultimately be discarded or recycled (i.e., the polymer in the sprue and runner systems).

In addition, conventional golf ball molding systems generally require polymers to be injected at relatively high initial pressures in order to deliver the polymer through lengthy sprue and runner systems. Such lengthy flow paths can result in uneven flow and excessive amounts of shear as the materials flow from lengthy sprue and runner systems into the mold cavities, reducing the quality of the golf balls.

SUMMARY

Golf balls and systems for applying one or more polymer layers to a golf ball construct are disclosed.

Disclosed mold systems can comprise a single cavity or a plurality of cavities. A plurality of cavities can increase throughput. Some systems have an even number of cavities, and some provide symmetry among the cavities, thereby improving flow balance among them.

In one embodiment, a method of forming a golf ball construct includes positioning a core or mantle portion of a golf ball in a cavity of a mold so that the core or mantle portion is substantially centered relative to the cavity. The viscous polymer is conveyed through an opening (e.g., a valve gate, hot tip gate, hot sprue gate, or hot edge gate) into a first short runner and into one or more radial runners that at least partially surround a circumference of the cavity. The first short runner is positioned between the cavity and the valve gate. The viscous polymer is then conveyed from one or more radial runners into radial gates and into a volume defined between the core or mantle portion and the mold so as to form a substantially uniformly distributed polymer layer. The polymer layer is allowed to solidify to form a solidified polymer layer, and the golf ball construct is removed from the mold cavity.

In some embodiments, the radial runner comprises a single runner system that substantially surrounds the cavity and the first short runner is substantially perpendicular to the radial runner at the area of intersection between the radial runner and the first short runner. The one or more radial runners can be circumferentially positioned relative to the cavity. In some embodiments, the plurality of radial gates can be spaced apart from one another to generally surround a circumference of the cavity. The distance between the valve gate and the intersection of the first short runner with the radial runner can be less than 0.5 inches.

In other embodiments, viscous polymer is conveyed into a second short runner and into one or more second radial runners that at least partially surround a second circumference of a second cavity. The second short runner is positioned between the second cavity and the valve gate. The viscous polymer is conveyed from the one or more second radial runners into one or more second radial gates and into a second volume defined between a second core or mantle portion that is positioned within the second cavity so as to form a substantially uniformly distributed second polymer layer. The second polymer layer is then allowed to solidify to form a second solidified polymer layer on a second golf ball, and the second golf ball construct is then removed from the mold cavity.

In some embodiments, the valve gate is positioned between the short runner and the second short runner and/or the first and second short runners are generally collinear. The polymer layer can, in some embodiments, be at least one inner layer of the golf ball construct or an outer most layer of the golf ball construct.

In another embodiment, an injection mold for manufacturing golf balls is provided. The mold includes a first substantially spherical cavity region, a first radial runner and gate system that at least partially surrounds a circumference of the first spherical cavity region, and a first short runner extending from a first valve gate to the first radial runner and gate system. The first short runner can have a length of less than 0.5 inches, as defined by a distance between the first valve gate and the first radial runner and gate system.

In some embodiments, the first radial runner and gate system includes a first radial runner that extends substantially around the circumference of the first spherical cavity region. One or more first radial gates can connect the first radial runner with the first spherical cavity region. The one or more first radial gates can include at least four first radial gates spaced apart from one another in a generally uniform manner.

In other embodiments, a second spherical cavity region, a second radial runner and gate system that at least partially surrounds a circumference of the second spherical cavity region, and a second short runner extending from the first valve gate to the second radial runner and gate system are provided. The second short runner also has a length of less than 0.5 inches, as defined by a distance between the first valve gate and the second radial runner and gate system. The first and second cavity regions, and the first and second radial runner and gate systems, form a first pair of mold cavity systems that are configured to receive injection materials from the first valve gate. In some embodiments, the first and second short runners are generally collinear and/or the valve gate is centrally located between the first and second cavity regions.

In another embodiment, the mold further includes a second pair of mold cavity systems. The second pair of mold cavity systems includes third and fourth substantially spherical cavity regions, third and fourth radial runner and gate systems that at least partially surrounds respective circumference of the third and fourth spherical cavity regions, and third and fourth short runners extending from a second valve gate to the respective third and fourth radial runner and gate system. The third and fourth short runners can have a length of less than 0.5 inches, as defined by a distance between the second valve gate and the third and fourth radial runner and gate systems.

In another embodiment, an injection mold is provided for forming a layer on a plurality of golf ball constructs. The mold includes a plurality of pairs of mold cavities, with each pair of mold cavities being configured to receive viscous polymer from a valve gate positioned between respective pairs of mold cavities. A plurality of short runners fluidly connect each gate member (e.g., a valve gate, hot tip gate, hot sprue gate, or hot edge gate) with its respective pair of mold cavities. A plurality of radial runner and gate systems are provided, with each short runner being fluidly connected to a radial runner and gate system. Each gate member is located between its respective pairs of mold cavities.

In some embodiments, each short runner extends from its respective gate member to its respective radial runner and gate system and each short runner can have a length of less than 0.5 inches, as defined by a distance between the respective gate member and the respective radial runner and gate system. The first and second short runners can be generally collinear. In other embodiments, each radial runner and gate system comprises a radial runner that at least partially surrounds a circumference of its respective mold cavity and/or each radial runner and gate system comprises a plurality of radial gates that are spaced apart from one another in a generally uniform manner.

Some disclosed systems can be used to mold a mantle or other internal layer of a golf ball. Some mantle layers comprise an elastomeric polymer. Liquid polymer can be injected into the spherical cavity and allowed to solidify. Afterward, the core/polymer assembly part can be removed from the mold. The core pins can assist ejecting the part by hand, by a robot, and/or by gravity.

A variety of polymers can be used. In particular, polymers in the polyurethane and ionomer families, as well as blends incorporating polymers from said families, are well suited to golf ball related embodiments. As used herein, "ionomer" refers to ionomeric polymers, copolymers and blends that incorporate an ionomeric polymer component.

Methods of forming one or more golf ball constructs are disclosed. For example, a liquid polymer can be injected into a mold defining a cavity. A core portion of a golf ball can be substantially centered relative to the cavity. A plurality of spaced-apart radial gates can be circumferentially positioned relative to the cavity. The liquid polymer can be conveyed into the cavity and through the plurality of radial gates, and into a volume defined between the core portion and the mold. The conveyed liquid polymer can form a substantially uniformly distributed polymer layer. The polymer layer can be allowed to solidify. A golf ball construct having been so formed can be removed from the mold cavity.

Golf balls are also disclosed. The cover substantially uniformly surrounds a core, and can be formed by a disclosed method. For example, such a method can comprise melting a thermoplastic resin and conveying the thermoplastic resin through a plurality of radial gates into a cavity so as to form the outer cover. The outer cover can be cooled, and the ball can be removed from the cavity.

Mold inserts are also disclosed. For example, this disclosure describes at least one of a plurality of operatively arrangeable injection-mold inserts, each of the plurality of inserts being configured to operatively engage at least one other of the plurality of injection mold inserts. When operatively arranged, the plurality of inserts defines a substantially spherical cavity for injection molding a layer of a golf ball construct. One of the plurality of injection mold inserts can comprise a recessed cavity region defining at least a portion of the substantially spherical cavity. The insert can also comprise a mating surface configured to matingly engage a corresponding mating surface of another of the injection mold inserts in the plurality. A radial gate surface can be recessed from the mating surface.

The foregoing and other features and advantages will become more apparent from the following detailed description, which proceeds with reference to the accompanying figures.

BRIEF DESCRIPTION OF THE DRAWINGS

FIG. 3 is an enlarged view of a portion of the cavity plate shown in FIG. 2.

FIG. 4 is an enlarged view of a portion of FIG. 2, showing a valve gate and a runner adjacent a mold cavity.

FIG. 9 is a cross-sectional view of a closed mold showing a mold gate for a hot runner system.

FIG. 10 is a cross-sectional view of a closed mold showing a mold gate for a hot runner system.

DETAILED DESCRIPTION

Figure 1:
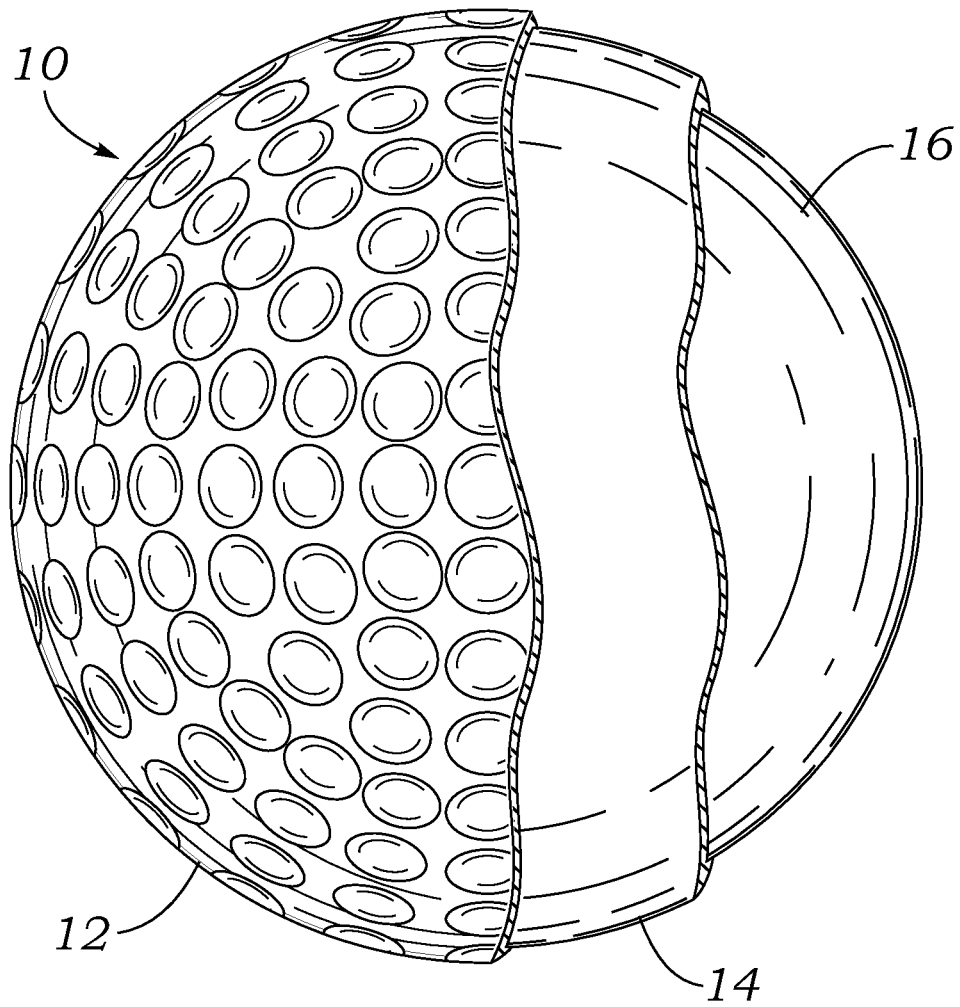
FIG. 1 shows a side elevation view of a golf ball having layers partially removed to reveal interior features.

With reference to FIG. 1, a golf ball 10 typically includes an outer cover 12 and one or more internal layers 14, 16. The outer cover 12 can comprise a polymeric layer. At least one mantle layer 14 can lie beneath the cover 12, and above one or more other layers forming a portion of the core 16 of the ball. Alternatively, a golf ball 10 can comprise an outer cover 12 comprising a polymeric layer and a unitary core 16 (e.g., without any intermediate mantle layer). The disclosed systems are suitable for forming the outer cover 12, the mantle layer 14, and other polymer layers of golf balls.

In conventional systems, a viscous polymer is caused to flow through a lengthy sprue and runner system to individual mold cavities. As discussed above, such lengthy conventional sprue and runner systems result in increased cooling times for mold cycles. In addition, such lengthy sprue and runner systems require polymers to be injected at relatively high initial pressures that can cause uneven flow and excessive amounts of shear, which can result in inferior product.

Figure 2:
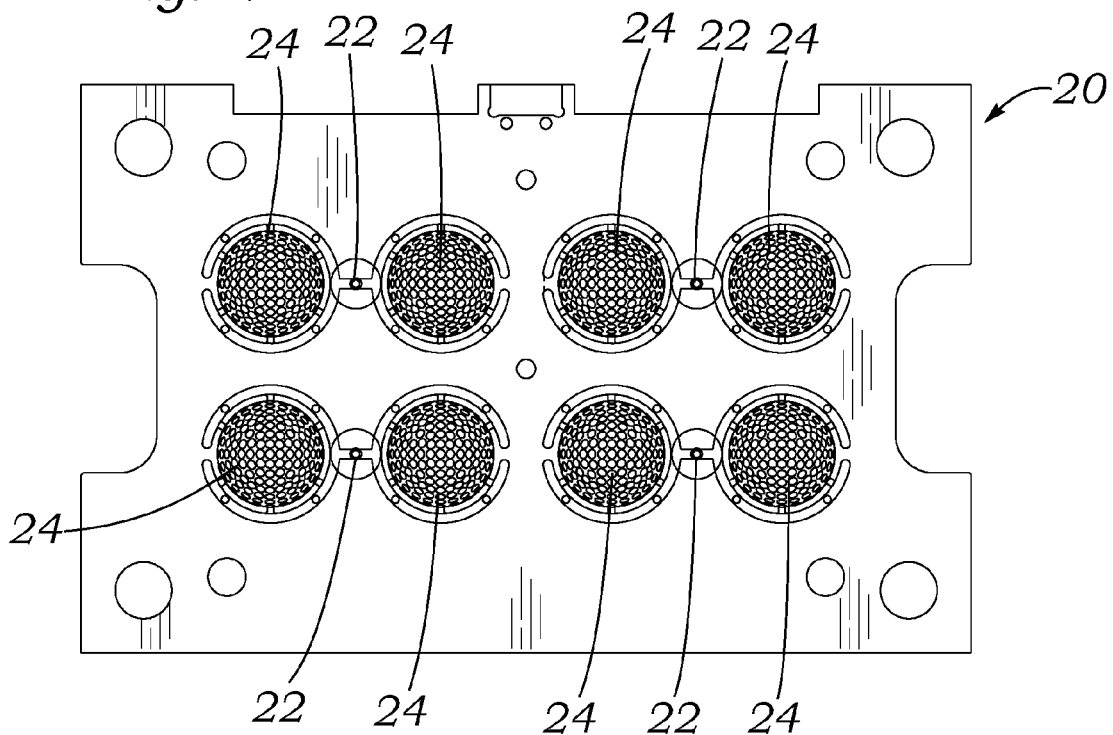
FIG. 2 is a top plan view of an exemplary cavity plate, illustrating a plurality of mold cavities.

FIG. 2 illustrates a top view of a portion of a mold 20 with valve gates 22 (or other gating members, such as hot tip gates, as described in more detail below) positioned adjacent one or more individual cavities 24 to reduce the length of travel for a viscous polymer (e.g., liquid or molten-state polymer) between respective valve gates 22 and cavities 24. The viscous polymer can be conveyed to the valve gate 22 of mold 20 using any suitable configuration, such as, for example, a hot runner, a hot sprue, or any other conventional runner system known in the art. By reducing the length of the flow from the introduction of the viscous polymer at a valve gate 22 to a cavity 24, the amount of excess material required for each mold cycle can be reduced, along with the additional cooling time associated with cooling that excess material.

FIG. 3 illustrates a close-up view of a portion of the mold 20 shown in FIG. 2. As shown in FIGS. 2 and 3, instead of traveling through conventional lengthy sprue and runner systems, the viscous polymer is delivered through valve gate 22 adjacent a mold cavity 24. Since valve gates 22 are adjacent mold cavities 24, the viscous polymer can be directed through a short runner 26 to mold cavity 24. From short runner 26, the viscous polymer can be delivered into mold cavity 24 in various manners. In the embodiment shown in FIG. 3, for example, the viscous polymer is delivered from short runner 26 to a radial runner and gate system 30 that substantially surrounds mold cavity 24. In some embodiments, the distance between the valve gate and the intersection of the short runner with the radial runner is less than 0.5 inches.

Radial runner and gate system 30 can comprise one or more radial runners 32 that generally surround the cavity 28 and one or more associated radial gates 34 that are approximately evenly spaced about the circumference 27 of the cavity 28. As discussed in more detail below, such an arrangement of runners, gates and cavities can provide a balanced (e.g., substantially symmetric) flow field of injection material and provide thin, injected-molded layers for golf balls.

FIG. 2 illustrates a plurality of valve gates 22 and a plurality of cavities 24, with each mold gate being located between two adjacent cavities such that the total number of mold gates is half that of the total number of cavities. However, it should be understood that other configurations are possible without departing from the scope of the invention. For example, in some embodiments, a separate valve gate 22 can be associated with each mold cavity 24 so that the ratio of valve gates to mold cavities is 1:1. In such an embodiment, each separate valve gate would be associated with a different short runner 26 that directs viscous polymer from the valve gate to the mold cavity.

The short runner 26 and radial runner 32 can each have a substantially circular cross-section. As shown in FIG. 3, injection material (e.g., polymer, ionomer, polyalkenamer composition, post-curable resin or thermoset plastic) can flow from a hot runner system (or other conventional system) through valve gate 22 to a short runner 26 that is adjacent to cavity 24. From the short runner, the injection material can flow to one or more radial runner 32 that generally surround the cavity. As shown in FIGS. 2 and 3, radial runners 32 can be circumferentially positioned relative to and radially spaced from a portion of a corresponding cavity 24. Polymer flows into the radial runners 32 directly from short runner 26, which can be generally perpendicular to the radial runners 32. If desired, radial runner 32 can convey polymer to one or more radial sub-runners 36 (as shown, for example, in FIG. 6). From the radial runner 32 (or radial sub-runners 36, if provided) injection material can be conveyed into a radial gate 34, opening to a corresponding mold cavity 24. In the embodiment shown in FIGS. 2-4, six radial gates 34 are spaced about a circumference of the cavity 24 and fed by one radial runner 32. It should be understood, however, that the number of radial gates and radial runners can vary.

Figure 5:
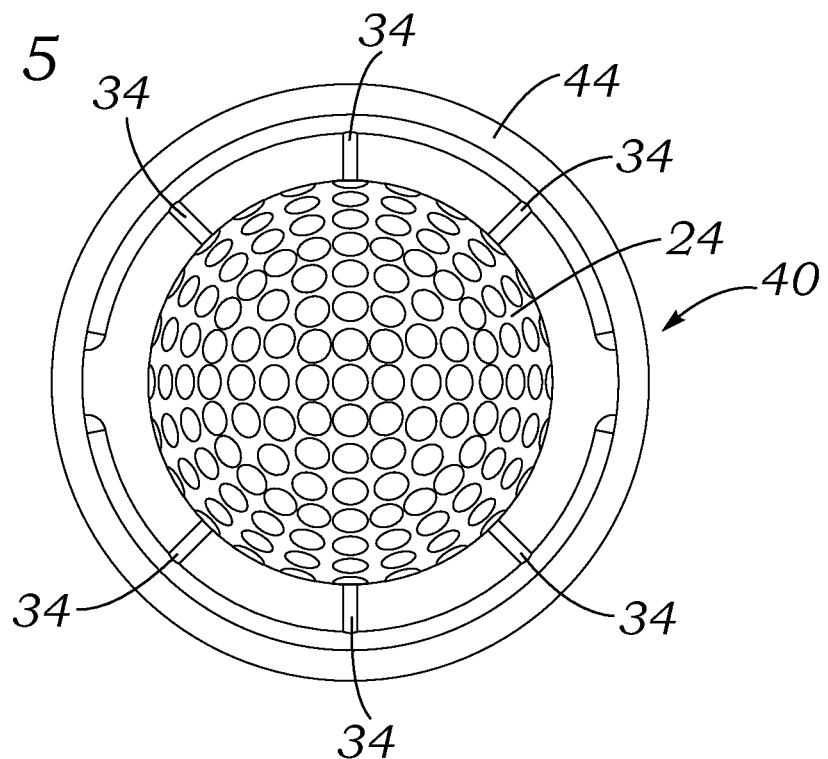
FIG. 5 is a detailed view of a top portion of the cavity shown in FIG. 3.
Figure 6:
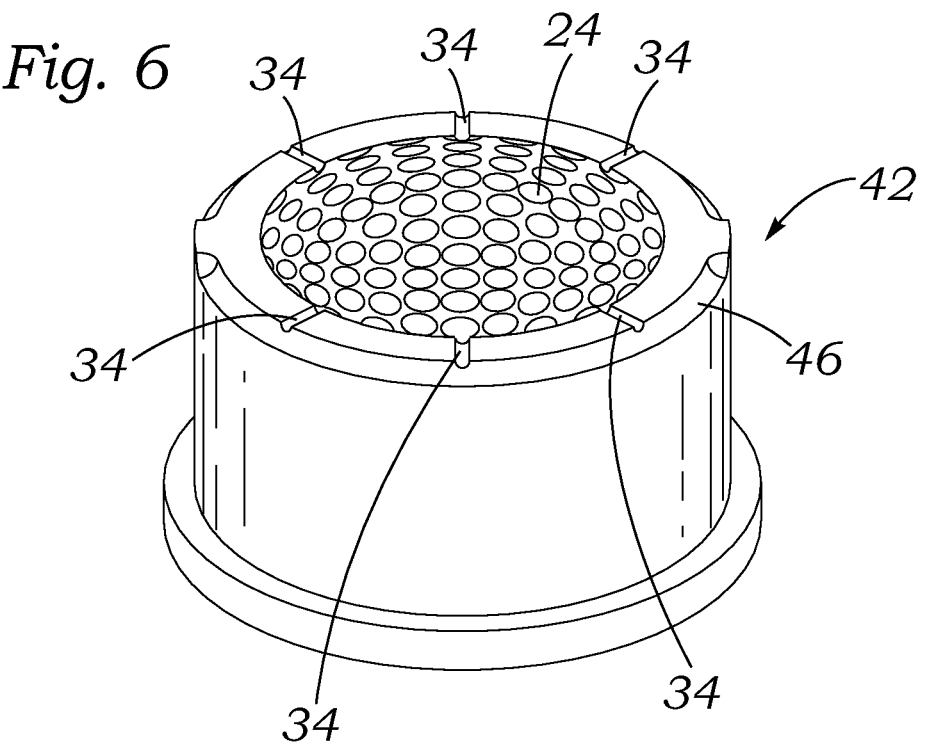
FIG. 6 is a detailed view of a bottom portion of the cavity shown in FIG. 3.

FIG. 5 is a detailed view of a top portion of an insert 40 associated with cavity 24 and FIG. 6 is a detailed view of a bottom portion of a mating insert 42. As shown in FIGS. 5 and 6, radial runner gates 34 can be positioned to generally surround cavity 24 along an approximate center of the substantially spherical cavity between its two poles and in a substantially axisymmetric arrangement about an axis running between the poles of the cavity 24. Thus, forces applied to a core during injection can be substantially balanced (or symmetric) by using such a symmetric configuration of radial gates 30 and runners, improving the ease with which the core 16 can be retained in a centered position relative to the cavity.

Figure 7:
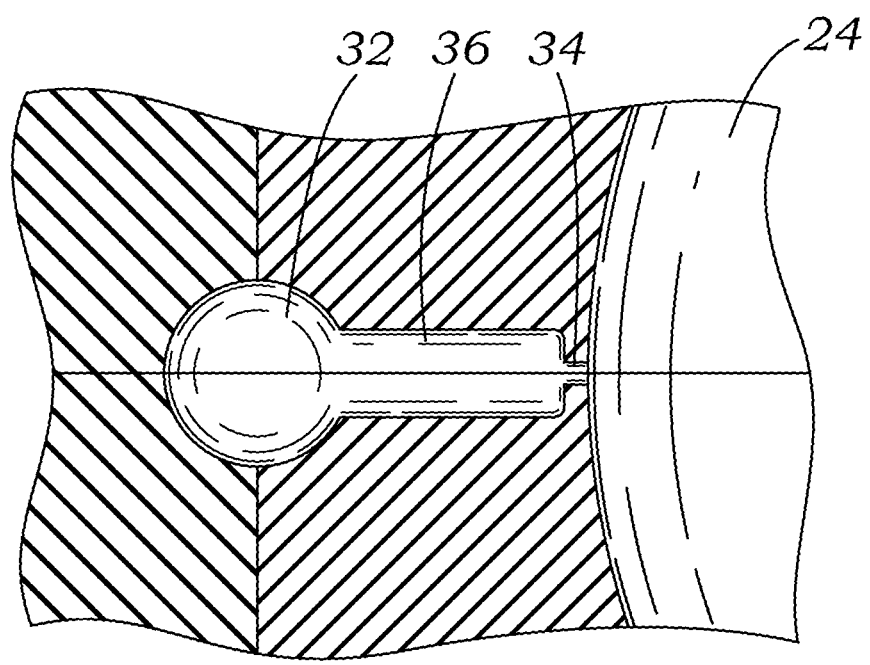
FIG. 7 is a cross-sectional view of an exemplary radial gate.

Referring to FIG. 7, an intersection of radial runner 32 with a radial sub-runner 36 is shown in cross-section. Radial gate 34 extends inwardly toward the cavity 24. The radial runner 32 can define a substantially circular or rounded cross-section, and can open to a radial sub-runner 36 that has a rectangular cross section. The end walls can define an opening to the radial gate 34, such that an injection material can flow from the sub-runner 36 into the gate 34. As shown in FIG. 4, a plurality of radial gates 34 can extend along radial runner 32. Alternatively, radial gate 34 can comprise a radial gate that extends along the full length of radial runner 32 and/or a corresponding radial sub-runner 36.

Referring again to FIGS. 5 and 6, inserts 40, 42 can define a hemispherical recessed portions (or regions) that define cavity 24. The pair of inserts 40, 42 can be positioned in an opposing relationship with respective mating surfaces 44, 46 engaged so as to define a substantially spherical cavity. Internal walls of the recessed portion can be textured as shown in FIGS. 5 and 6 with internally extending bumps for forming a dimple pattern in an injected layer (e.g., the external surface of the outer layer 12 (FIG. 1)). Each insert 40, 42 can also define other recessed regions to form the radial gates 34.

Inserts 40, 42 shown in FIG. 5 can have a unitary construction and can be preferably made from an alloy of tool steel. Other inserts comprise multiple parts coupled together. Some molds (not shown) comprise the recessed features and do not incorporate any removable inserts.

Figure 8:
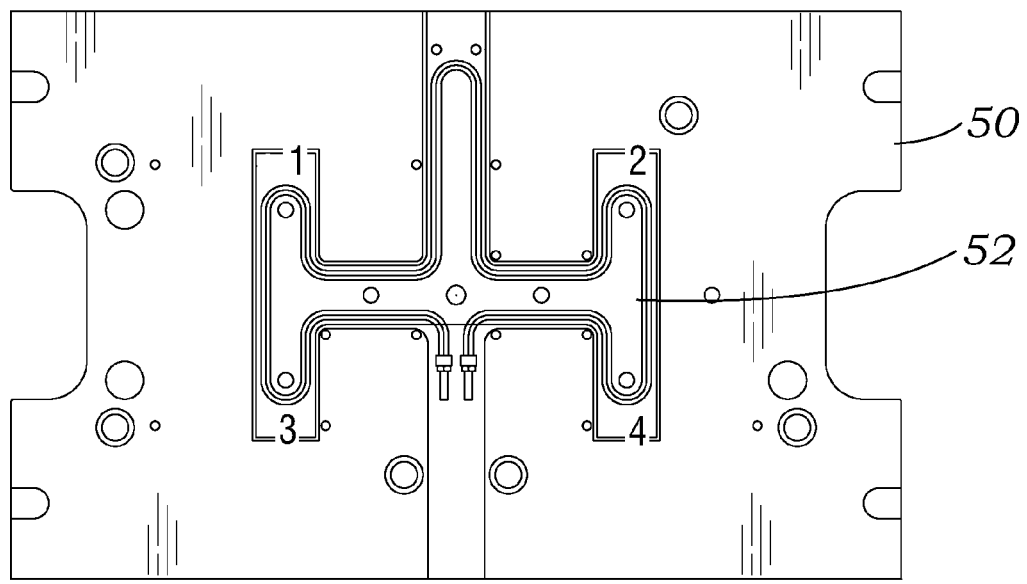
FIG. 8 is a view of an exemplary heated manifold.

A heated manifold 50 can be provided to keep the injection material molten and ready for injection in to the cavities after it passes through valve gates 22. As shown in FIG. 8, manifold 50 can comprise a heater 52, such as an electric heater, that is positioned in the vicinity of short runners 26 to heat material as it passes though the short runners 26. Locations of four valve gates, relative to the heated manifold 50, are identified in FIG. 8 using numbers 1, 2, 3, and 4.

FIG. 9 illustrates a cross-sectional view of an assembled mold 20. As shown in FIG. 9, a core 16 can be centrally retained within a spherical cavity 24 by a plurality of core pins 54. During a molding process, the heated polymer layer can be injected into the open volume defined between the inserts 40, 42, and the core 16. Each of the core pins 54 can retract during injection of an injection material, allowing the material to flow completely around the core 16 and form a corresponding enclosed polymeric layer surrounding the core. After the layer has solidified (e.g., the injected layer has cooled), the core pins 54 can be extended to assist in ejecting the part from the mold.

FIG. 9 also illustrates an exemplary operation of a hot valve 56. As discussed above, heated viscous polymer can be conveyed from a hot runner system (or other similar system) into the mold system 20 via hot valve 56 and valve gate 22. As discussed above, any conventional system can be used to convey the material to the location of the valve gates(s) 22. After passing though the valve gate 22 and being conveyed the short distance to the radial runner 32, the polymer (or other injection material) can be injected into the volume defined between the core 16 and the cavity walls of the inserts 40, 42.

FIG. 10 illustrates an embodiment similar to that shown in FIG. 9, except that the manifold 50 is located lower that depicted elsewhere. For example, in one embodiment, the manifold can be positioned at the lowest plate of the mold base.

Disclosed molds can be configured to form a mantle layer 14, or other intermediate layer, of a golf ball. In such embodiments, the cavity 24 can be sized relative to the core 16 so as to form a layer having a desired wall thickness.

Following injection of a polymer (or other injection material) into the cavity 24, a hold pressure can be applied for a certain duration (or "hold time") to ensure that a suitable amount of material flows into the cavity and/or to inhibit the material from flowing back into the radial runner 32. A golf ball (or other construct) can be retained in the cavity 24 for a period of time so as to allow the molded layer to adequately harden (or solidify) before being removed from the mold. One or more ejector pins can advance into the cavity to assist with removal of the golf ball and/or the runners. The molded construct(s), along with any excess material from the short runner 26 and radial gate and runner system 30 formed during the molding process, can be removed from the mold by hand, by a robot, by the injection molding machine, by the force of gravity, or by other known and/or equivalent techniques. After the construct(s) have been removed, individual pieces (e.g., golf balls) can be mechanically separated from the runner system and/or undergo other finishing operations (e.g., to remove residual gate vestige from an outer surface). Because of the elimination of all or portions of runners and sprues required by conventional molding systems as discussed above, significant reductions in mold cycle times and waste can be achieved.

A variety of polymers (or other injection materials) are suitable for use with disclosed molds and methods for forming injection molded outer covers and/or mantle layers 16. Some injection materials comprise polymers that are reinforced with fibers or fillers.

Regarding the outer cover, some suitable materials include ionomeric polymers, such as those resins marketed under the Surlyn® and HPF marks owned by the E. I. du Pont de Nemours and Company (DuPont), amine-modified ionomers, ionomeric copolymers and blends, thermoplastic polyurethanes and other polymers.

Examples of injection materials that are suitable for forming a mantle layer include elastomeric thermoplastic polymers, such as, for example, thermoplastic rubbers (e.g., polybutadiene), ionomers (e.g., Surlyn® and HPF materials), and synthetic elastomeric tri-block copolymers, (e.g., Hytrel®, marketed by DuPont, Pebax® marketed by Arkema and polyurethanes). Additionally, some systems are suitable for molding thermosetting polymers, including RIM formulations, to form an outer cover and/or inner layer of a golf ball.

Other injection materials are also possible, such as, for example, those disclosed below, and those disclosed in U.S. Patent Publication 2009-0209367-A1, published Aug. 20, 2009, assigned to the assignee of this application, and incorporated herein by reference in its entirety. Some examples of such injection materials include polymeric materials generally considered useful for making golf balls, including, without limitation, synthetic and natural rubbers, thermoset polymers such as thermoset polyurethanes and thermoset polyureas, as well as thermoplastic polymers including thermoplastic elastomers. Any isocyanate, polyol, or polyamine is suitable for use as an injection material. Diisocyante and polyol or polyamine components may be previously combined to form a prepolymer prior to reaction with a chain extender or curing agent in producing acceptable injection materials.

In view of the aforementioned advantages of injection molding versus the more complex casting process, under some circumstances it is advantageous to have formulations which are able to cure as a thermoset but only within a specified temperature range which is above that of the typical injection molding process. This allows parts, such as golf ball cover layers, to be initially injection molded, followed by subsequent processing at higher temperatures and pressures to induce further crosslinking and curing, resulting in thermoset properties in the final part. Such an initially injection moldable composition is thus called a post curable urethane or urea composition.

If a post curable polyurea or polyurethane composition is used, a modified or blocked diisocyanate which subsequently unblocks and induces further cross linking post extrusion may be included in a diisocyanate starting material. Such a system is disclosed by Kim et al. in U.S. Pat. No. 6,939,924, the entire contents of which are hereby incorporated by reference. Alternatively, a thermoplastic urethane or urea composition further comprising a peroxide or peroxide mixture can result in a thermoset. Such a system is disclosed by Kim in U.S. Pat. No. 6,924,337, the entire contents of which are hereby incorporated by reference. Thermoplastic urethane or urea compositions may further comprise a reaction product of a nitroso compound and a diisocyanate or a polyisocyanate to induce further cross linking post extrusion may be included in the diisocyanate starting material. Such a system is disclosed by Kim et al. in U.S. Pat. No. 7,037,985 B2, the entire contents of which are hereby incorporated by reference.

Example 1

Temperatures, injection pressure, and cold runner weight (i.e., waste/recycled materials) were compared for a conventional molding system and an exemplary novel molding system (i.e., a molding system with a valve gate and pair of short runners as described herein). For this comparison, the test method comprised molding a cover layer with ISB3 resin on a 1.6 inch mantle. The same injection molding machine, mantle insert, and resin was used for each test, with only the molds varying.

The comparison testing indicated that the novel molding system can operate using temperatures that are about 15° C. lower than conventional molds with cold runner systems. Similar, the novel molding system advantageously reduced injection pressures up to about 27% and runner-weights up to about 35%.

Alternative Embodiments

The mold 20 shown in FIG. 2 has eight cavities, although a different number of cavities is possible (e.g., the mold 20 can define fewer than eight cavities (e.g., four or six cavities), or more than eight cavities (e.g., ten or twelve cavities). A larger number of cavities can increase manufacturing throughput, but can also lead to a process that is more difficult to control. To achieve a balanced flow field, symmetric molds (e.g., an even number of cavities) can be used.

As discussed above, viscous material can be conveyed to valve gates in various manners, including, for example, via a hot runner system. Polymer injection can be parallel to a parting line of the mold, and an injection apparatus can be oriented vertically or horizontally, though horizontal orientation of the injection apparatus is preferable. The precise dimensions and characteristics of disclosed embodiment can be selected based, at least in part, on several parameters, including the number of cavities, the polymer material, and the injection molding machine being used.

Substantially uniform spacing among radial gates have been described above. Other molds can have non-uniform spacing between adjacent gates. Such non-uniform spacing can depend, in part, on the number, size and/or shape of the runners and/or gates. Configurations of the short runners and radial runners can depend on a number of variables, including, for example, the number of cavities in a particular mold, the number of gates for each cavity, the size of the mold, the configuration of the injection molding machine used to drive the injection material, the desired configuration of the layer that is being formed, and the injection material used.

In some injection mold inserts, the radial gates can comprise radial film gates that extend along a great length of the radial runner. Radial film gates are disclosed, for example, in U.S. Patent Publication 2011-0130216-A1, published Jun. 2, 2011, assigned to the assignee of this application, and incorporated herein by reference in its entirety. In such embodiments, for example, the radial film gate region can be recessed from the mating surface by about 0.010 inch and about 0.030 inch. Each radial film gate portion preferably defines a gate opening having a width-to-thickness ratio of at least 4:1.

Cavities of a given mold can be fed by six radial gates as shown in FIG. 4. However, in other embodiments, fewer than six radial gates can be provided. In such cases, if desired, the width of each radial gate can be increased. In other embodiments, more than six radial gates can be provided.

Gating Systems

Although the example described above comprises a valve gated system, which uses a mechanical shut off at the gate (e.g., a pneumatically active piston within a cylindrical housing as shown in FIG. 9), it should be understood that other types of gates can be used. For example, the systems and methods described herein can alternatively utilize a hot tip gating system in which a smaller open gate (e.g., a pin-point gate with a small vestige) is utilized. Still other gating systems can be used depending on the specific injection materials and arrangement of the mold, such as hot sprue gating or hot edge gating.

Injection Materials

Polymeric materials generally considered useful for making golf balls according to the process of the present invention may also be included in the components of the golf balls of the present invention and these include, without limitation, synthetic and natural rubbers, thermoset polymers such as other thermoset polyurethanes or thermoset polyureas, as well as thermoplastic polymers including thermoplastic elastomers such as metallocene catalyzed polymer, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyamides, copolyamides, polyesters, copolyesters, polycarbonates, polyolefins, halogenated (e.g. chlorinated) polyolefins, halogenated polyalkylene compounds, such as halogenated polyethylene [e.g. chlorinated polyethylene (CPE)], polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic copolymers, functionalized styrenic copolymers, functionalized styrenic terpolymers, styrenic terpolymers, cellulosic polymers, liquid crystal polymers (LCP), ethylene-propylene-diene terpolymers (EPDM), ethylene-vinyl acetate copolymers (EVA), ethylene-propylene copolymers, ethylene vinyl acetates, polyureas, and polysiloxanes and any and all combinations thereof.

A most preferred polymeric material for golf balls is a polyurea or polyurethane, prepared by combining a diisocyanate with either a polyamine or polyol respectively, and one or more chain extenders (in the case of a thermoplastic polyurea or polyurethane) or curing agents (in the case of a thermoset polyurea or polyurethane). The final composition may advantageously be employed as an intermediate layer in a golf ball and even more advantageously as an outer cover layer.

Any isocyanate available to one of ordinary skill in the art is suitable for use according to the invention. Isocyanates for use with the present invention include, but are not limited to, aliphatic, cycloaliphatic, aromatic aliphatic, aromatic, any derivatives thereof, and combinations of these compounds having two or more isocyanate (NCO) groups per molecule. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI). The isocyanates may be organic polyisocyanate-terminated prepolymers, low free isocyanate prepolymer, and mixtures thereof. The isocyanate-containing reactable component may also include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic, aromatic, or linear or branched hydrocarbon moiety containing from about 1 to about 50 carbon atoms. The isocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclohexyl isocyanate, 1-isocyanato-3,3,5-trimethyl-5-isocyanatomethylcyclohexane, cyclo-hexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4"-triisocyanate, isocyanatoethyl methacrylate, 3-isopropenyl-$\alpha,\alpha$-dimethylbenzyl-isocyanate, dichlorohexamethylene diisocyanate, w, $\omega$'-diisocyanato-1,4-diethylbenzene, polymethylene polyphenylene polyisocyanate, isocyanurate modified compounds, and carbodiimide modified compounds, as well as biuret modified compounds of the above polyisocyanates. These isocyanates may be used either alone or in combination. These combination isocyanates include triisocyanates, such as biuret of hexamethylene diisocyanate and triphenylmethane triisocyanates, and polyisocyanates, such as polymeric diphenylmethane diisocyanate.triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof, dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Any polyol available to one of ordinary skill in the polyurethane art is suitable for use according to the invention. Polyols suitable for use in the reduced-yellowing compositions of the present invention include, but are not limited to, polyester polyols, polyether polyols, polycarbonate polyols and polydiene polyols such as polybutadiene polyols.

Polyester polyols are prepared by condensation or step-growth polymerization utilizing diacids. Primary diacids for polyester polyols are adipic acid and isomeric phthalic acids. Adipic acid is used for materials requiring added flexibility, whereas phthalic anhydride is used for those requiring rigidity. Some examples of polyester polyols include poly(ethylene adipate) (PEA), poly(diethylene adipate) (PDA), poly (propylene adipate) (PPA), poly(tetramethylene adipate) (PBA), poly(hexamethylene adipate) (PHA), poly(neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of $\epsilon$-caprolactone, and polyol obtained by opening the ring of $\beta$-methyl-$\delta$-valerolactone with ethylene glycol can be used either alone or in a combination thereof. Additionally, polyester polyol may be composed of a copolymer of at least one of the following acids and at least one of the following glycols. The acids include terephthalic acid, isophthalic acid, phthalic anhydride, oxalic acid, malonic acid, succinic acid, pentanedioic acid, hexanedioic acid, octanedioic acid, nonanedioic acid, adipic acid, azelaic acid, sebacic acid, dodecanedioic acid, dimer acid (a mixture), $\rho$-hydroxybenzoate, trimellitic anhydride, $\epsilon$-caprolactone, and $\beta$-methyl-$\delta$-valerolactone. The glycols includes ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol.

Polyether polyols are prepared by the ring-opening addition polymerization of an alkylene oxide (e.g. ethylene oxide and propylene oxide) with an initiator of a polyhydric alcohol (e.g. diethylene glycol), which is an active hydride. Specifically, polypropylene glycol (PPG), polyethylene glycol (PEG) or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide. Specifically, tetrahydrofuran-propylene oxide copolymer or tetrahydrofuran-ethylene oxide copolymer can be formed. The polyether polyol may be used either alone or in a combination.

Polycarbonate polyol is obtained by the condensation of a known polyol (polyhydric alcohol) with phosgene, chloroformic acid ester, dialkyl carbonate or diallyl carbonate. Particularly preferred polycarbonate polyol contains a polyol component using 1,6-hexanediol, 1,4-butanediol, 1,3-butanediol, neopentylglycol or 1,5-pentanediol. Polycarbonate polyols can be used either alone or in a combination with other polyols.

Polydiene polyol includes liquid diene polymer containing hydroxyl groups having an average of at least 1.7 functional groups, and may be composed of diene polymer or diene copolymer having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant.

Polybutadiene polyol includes liquid diene polymer containing hydroxyl groups having an average of at least 1.7 functional groups, and may be composed of diene polymer or diene copolymer having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant.

Any polyamine available to one of ordinary skill in the polyurethane art is suitable for use according to the invention. Polyamines suitable for use in the reduced-yellowing compositions of the present invention include, but are not limited to, the amine-terminated compound is selected from the group consisting of amine-terminated hydrocarbons, amine-terminated polyethers, amine-terminated polyesters, amine-terminated polycaprolactones, amine-terminated polycarbonates, amine-terminated polyamides, and mixtures thereof. The amine-terminated compound may be a polyether amine selected from the group consisting of polytetramethylene ether diamines, polyoxypropylene diamines, poly(ethylene oxide capped oxypropylene) ether diamines, triethyleneglycoldiamines, propylene oxide-based triamines, trimethylolpropane-based triamines, glycerin-based triamines, and mixtures thereof.

The previously described diisocyante and polyol or polyamine components may be previously combined to form a prepolymer prior to reaction with the chain extender or curing agent. Any such prepolymer combination is suitable for use in the present invention. Commercially available prepolymers include LFH580, LFH120, LFH710, LFH1570, LF930A, LF950A, LF601D, LF751D, LFG963A, LFG640D.

One preferred prepolymer is a toluene diisocyanate prepolymer with polypropylene glycol. Such polypropylene glycol terminated toluene diisocyanate prepolymers are available from Uniroyal Chemical Company of Middlebury, Conn., under the trade name ADIPRENE® LFG963A and LFG640D. Most preferred prepolymers are the polytetramethylene ether glycol terminated toluene diisocyanate prepolymers including those available from Uniroyal Chemical Company of Middlebury, Conn., under the trade name ADIPRENE® LF930A, LF950A, LF601D, and LF751D.

In one embodiment, the number of free NCO groups in the urethane or urea prepolymer may be less than about 14 percent. Preferably the urethane or urea prepolymer has from about 3 percent to about 11 percent, more preferably from about 4 to about 9.5 percent and even more preferably from about 3 percent to about 9 percent free NCO on an equivalent weight basis.

In view of the aforementioned advantages of injection molding versus the more complex casting process, under some circumstances it is advantageous to have formulations which are able to cure as a thermoset but only within a specified temperature range which is above that of the typical injection molding process. This allows parts, such as golf ball cover layers, to be initially injection molded, followed by subsequent processing at higher temperatures and pressures to induce further crosslinking and curing, resulting in thermoset properties in the final part. Such an initially injection moldable composition is thus called a post curable urethane or urea composition. Post curable urethane and urea compositions are examples of post curable resins which work well with the disclosed process.

If a post curable polyurea or polyurethane composition is required, a modified or blocked diisocyanate which subsequently unblocks and induces further cross linking post extrusion may be included in the diisocyanate starting material. Such a system is disclosed by Kim et al in U.S. Pat. No. 6,939,924, the entire contents of which are hereby incorporated by reference. Alternatively, a thermoplastic urethane or urea composition further comprising a peroxide or peroxide mixture, can then under post curing to result in a thermoset. Such a system is disclosed by Kim in U.S. Pat. No. 6,924,337, the entire contents of which are hereby incorporated by reference. Finally the thermoplastic urethane or urea compositions may further comprising a reaction product of a nitroso compound and a diisocyanate or a polyisocyanate to induce further cross linking post extrusion may be included in the diisocyanate starting material Such a system is disclosed by Kim et al. in U.S. Pat. No. 7,037,985 B2, the entire contents of which are hereby incorporated by reference.

Because the polyureas or polyurethanes used to make the covers of such golf balls generally contain an aromatic, component, e.g., aromatic diisocyanate, polyol, or polyamine, they are susceptible to discoloration upon exposure to light, particularly ultraviolet (UV) light. To slow down the discoloration, light and UV stabilizers, e.g., TINUVIN® 770, 765, and 328, are added to these aromatic polymeric materials. In addition, non-aromatic components may be used to minimize this discoloration, one example of which is described in U.S. patent application Ser. No. 11/809,432, filed on May 31, 2007, which issued as U.S. Pat. No. 7,879,968 on Feb. 1, 2011, the entire contents of which are hereby incorporated by reference.

The outer cover and/or one or intermediate layers of the golf ball may also comprise one or more ionomer resins. One family of such resins was developed in the mid-1960's, by E.I. DuPont de Nemours and Co., and sold under the trademark SURLYN®. Preparation of such ionomers is well known, for example see U.S. Pat. No. 3,264,272. Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer." The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Me^{2+}$, with the $Li^+$, $Na^+$, $Ca^{2+}$, $Zn^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid, although it was also well known at that time that, as a general rule, the hardness of these cover materials could be increased with increasing acid content. Hence, in Research Disclosure 29703, published in January 1989, DuPont disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers can be ionomer resins with acrylic or methacrylic acid units present from 16 wt. % to about 35 wt. % in the polymer. Generally, such a high acid ionomer will have a flexural modulus from about 50,000 psi to about 125,000 psi.

Ionomer resins further comprising a softening comonomer, present from about 10 wt. % to about 50 wt. % in the polymer, have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

Today, there are a wide variety of commercially available ionomer resins based both on copolymers of ethylene and (meth)acrylic acid or terpolymers of ethylene and (meth)acrylic acid and (meth)acrylate, all of which many of which are be used as a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y polymer, wherein E is ethylene, X is a $C_3$ to $C_8$ $\alpha,\beta$ ethylenically unsaturated carboxylic acid, such as acrylic or methacrylic acid, and is present in an amount from about 2 to about 30 weight % of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight % of the E/X/Y copolymer, and wherein the acid groups present in said ionomeric polymer are partially neutralized with a metal selected from the group consisting of lithium, sodium, potassium, magnesium, calcium, barium, lead, tin, zinc or aluminum, and combinations thereof.

The ionomer may also be a so-called bimodal ionomer as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising:
  a) a high molecular weight component having a weight average molecular weight, Mw, of about 80,000 to about 500,000 and comprising one or more ethylene/α, β-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, zinc, calcium, magnesium, and a mixture of any these; and
  b) a low molecular weight component having a weight average molecular weight, Mw, of from about 2,000 to about 30,000 and comprising one or more ethylene/α, β-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, potassium, magnesium, calcium, barium, lead, tin, zinc or aluminum, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication No. US 2003/0158312 A1, the entire contents of, all of which are herein incorporated by reference.

The modified unimodal ionomers may be prepared by mixing:
  a) an ionomeric polymer comprising ethylene, from 5 to 25 weight percent (meth)acrylic acid, and from 0 to 40 weight percent of a (meth)acrylate monomer, said ionomeric polymer neutralized with metal ions selected from the group consisting of lithium, sodium, potassium, magnesium, calcium, barium, lead, tin, zinc or aluminum, and any and all mixtures thereof; and
  b) from about 5 to about 40 weight percent (based on the total weight of said modified ionomeric polymer) of one or more fatty acids or metal salts of said fatty acid, the metal selected from the group consisting of lithium, sodium, potassium, magnesium, calcium, barium, lead, tin, zinc or aluminum, and any and all mixtures thereof; and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing;
  a) a high molecular weight component having a weight average molecular weight, Mw, of about 80,000 to about 500,000 and comprising one or more ethylene/α, β-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, potassium, magnesium, calcium, barium, lead, tin, zinc or aluminum, and any and all mixtures thereof; and
  b) a low molecular weight component having a weight average molecular weight, Mw, of from about 2,000 to about 30,000 and comprising one or more ethylene/α, β-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, potassium, magnesium, calcium, barium, lead, tin, zinc or aluminum, and any and all mixtures thereof; and
  c) from about 5 to about 40 weight percent (based on the total weight of said modified ionomeric polymer) of one or more fatty acids or metal salts of said fatty acid, the metal selected from the group consisting of lithium, sodium, potassium, magnesium, calcium, barium, lead, tin, zinc or aluminum, and any and all mixtures thereof; and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The generic formula for all fatty and waxy acids above acetic acid is $CH_3(CH_2)_xCOOH$, wherein the carbon atom count includes the carboxyl group (i.e. x=2-73). The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to stearic acid ($C_{18}$, i.e., $CH_3(CH_2)_{16}COOH$), palmitic acid ($C_{16}$, i.e., $CH_3(CH_2)_{14}COOH$), pelargonic acid ($C_9$, i.e., $CH_3(CH_2)_7COOH$) and lauric acid ($C_{12}$, i.e., $CH_3(CH_2)_{10}OCOOH$). Examples of suitable unsaturated fatty acids, i.e., a fatty acid in which there are one or more double bonds between the carbon atoms in the alkyl chain, include but are not limited to oleic acid ($C_{13}$, i.e., $CH_3(CH_2)_7CH:CH(CH_2)_7COOH$).

The source of the metal ions used to produce the metal salts of the fatty or waxy acid salts used in the various modified ionomers are generally various metal salts which provide the metal ions capable of neutralizing, to various extents, the carboxylic acid groups of the fatty acids. These include the sulfate, carbonate, acetate and hydroxylate salts of zinc, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of said fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion. An example of such a modified ionomer polymer is DuPont® HPF-1000 available from E. I. DuPont de Nemours and Co. Inc.

A preferred ionomer composition may be prepared by blending one or more of the unimodal ionomers, bimodal ionomers, or modified unimodal or bimodal ionomeric polymers as described herein, and further blended with a zinc neutralized ionomer of a polymer of general formula E/X/Y where E is ethylene, X is a softening comonomer such as acrylate or methacrylate and is present in an amount of from 0 to about 50, preferably 0 to about 25, most preferably 0, and Y is acrylic or methacrylic acid and is present in an amount from about 5 wt. % to about 25, preferably from about 10 to about 25, and most preferably about 10 to about 20 wt % of the total composition.

The outer cover and/or one or intermediate layers of the golf ball may also comprise one or more polyamide resins. Illustrative polyamides for use in the golf balls disclosed include those obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; (4) copolymerization of a cyclic lactam with a dicarboxylic acid and a diamine; or any combination of (1)-(4). In certain examples, the dicarboxylic acid may be an aromatic dicarboxylic acid or a cycloaliphatic dicarboxylic acid. In certain examples, the diamine may be an aromatic diamine or a cycloaliphatic diamine. Specific examples of suitable polyamides include polyamide 6; polyamide 11; polyamide 12; polyamide 4,6; polyamide 6,6; polyamide 6,9; polyamide 6,10; polyamide 6,12; polyamide MXD6; PA12, CX; PA12, IT; PPA; PA6, IT; and PA6/PPE.

The polyamide may be any homopolyamide or copolyamide. One example of a group of suitable polyamides is thermoplastic polyamide elastomers. Thermoplastic polyamide elastomers typically are copolymers of a polyamide and polyester or polyether. For example, the thermoplastic polyamide elastomer can contain a polyamide (Nylon 6, Nylon 66, Nylon 11, Nylon 12 and the like) as a hard segment and a polyether or polyester as a soft segment. In one specific example, the thermoplastic polyamides are amorphous copolyamides based on polyamide (PA 12).

Examples of copolyester thermoplastic elastomers include polyether ester block copolymers, polylactone ester block copolymers, and aliphatic and aromatic dicarboxylic acid copolymerized polyesters. Polyether ester block copolymers are copolymers comprising polyester hard segments polymerized from a dicarboxylic acid and a low molecular weight diol, and polyether soft segments polymerized from an alkylene glycol having 2 to 10 atoms. Polylactone ester block copolymers are copolymers having polylactone chains instead of polyether as the soft segments discussed above for polyether ester block copolymers. Aliphatic and aromatic dicarboxylic copolymerized polyesters are copolymers of an acid component selected from aromatic dicarboxylic acids, such as terephthalic acid and isophthalic acid, and aliphatic acids having 2 to 10 carbon atoms with at least one diol component, selected from aliphatic and alicyclic diols having 2 to 10 carbon atoms. Blends of aromatic polyester and aliphatic polyester also may be used for these. Examples of these include products marketed under the trade names HYTREL by E.I. DuPont de Nemours & Company, and SKYPEL by S.K. Chemicals. The polyether block comprises different units such as units which derive from ethylene glycol, propylene glycol, or tetramethylene glycol.

One type of polyetherester elastomer is the family of Pebax, which are available from Elf-Atochem Company. Preferably, the choice can be made from among Pebax 2533, 3533, 4033, 1205, 7033 and 7233. Some examples of suitable polyamides for use include those commercially available under the trade names PEBAX, CRISTAMID and RILSAN marketed by Atofina Chemicals of Philadelphia, Pa., GRIVORY and GRILAMID marketed by EMS Chemie of Sumter, S.C., TROGAMID and VESTAMID available from Degussa, and ZYTEL marketed by E.I. DuPont de Nemours & Co., of Wilmington, Del.

The outer cover and/or one or intermediate layers of the golf ball may also comprise a blend of an ionomer and a block copolymer. Examples of such block copolymers include styrenic block copolymers including styrene-butadiene-styrene (SBS), styrene-ethylene-butylene-styrene, (SEBS) and styrene-ethylene/propylene-styrene (SETS). Also included are functionalized styrenic block copolymers, including those where the block copolymer incorporates a first polymer block having an aromatic vinyl compound, a second polymer block having a conjugated diene compound and a hydroxyl group located at a block copolymer, or its hydrogenation product, and in which the ratio of block copolymer to ionomer ranges from 5:95 to 95:5 by weight, more preferably from about 10:90 to about 90:10 by weight, more preferably from about 20:80 to about 80:20 by weight, more preferably from about 30:70 to about 70:30 by weight and most preferably from about 35:65 to about 65:35 by weight. A preferred functionalized styrenic block copolymer is SEPTON HG-252. Such blends are described in more detail in commonly-assigned U.S. Pat. No. 6,861,474 and U.S. Patent Publication No. 2003/0224871 both of which are incorporated herein by reference in their entireties.

More preferred blends of block copolymers include from about 85 to about 99 wt % (based on the combined weight of Components A and B) of a block copolymer; and (B) from about 1 to about 15 wt % (based on the combined weight of Components A and B) of one or more modifying agents selected from the group consisting of amino acids, aminotriazines, dicyandiamides and polyamines and any and all combinations thereof.

Another preferred material for the outer cover and/or one or intermediate layers of the golf ball is a composition prepared by blending together at least three materials, identified as Components A, B, and C, and melt-processing these components to form in-situ, a polymer blend composition incorporating a pseudo-crosslinked polymer network. Such blends are described in more detail in commonly-assigned U.S. Pat. No. 6,930,150, to Kim et al., the content of which is incorporated by reference herein in its entirety. Component A is a monomer, oligomer, prepolymer or polymer that incorporates at least five percent by weight of at least one type of an acidic functional group. Examples of such polymers suitable for use as include, but are not limited to, ethylene/(meth)acrylic acid copolymers and ethylene/(meth)acrylic acid/alkyl (meth)acrylate terpolymers, or ethylene and/or propylene maleic anhydride copolymers and terpolymers. Examples of such polymers which are commercially available include, but are not limited to, the Escor® 5000, 5001, 5020, 5050, 5070, 5100, 5110 and 5200 series of ethylene-acrylic acid copolymers sold by Exxon and the PRIMACOR® 1321, 1410, 1410-XT, 1420, 1430, 2912, 3150, 3330, 3340, 3440, 3460, 4311, 4608 and 5980 series of ethylene-acrylic acid copolymers sold by The Dow Chemical Company, Midland, Mich. and the ethylene-acrylic acid copolymers Nucrel 599, 699, 0903, 0910, 925, 960, 2806, and 2906 ethylene-methacrylic acid copolymers sold by DuPont. Also included are the bimodal ethylene/carboxylic acid polymers as described in U.S. Pat. No. 6,562,906, the contents of which are incorporated herein by reference. These polymers comprise ethylene/$\alpha$, $\beta$-ethylenically unsaturated $C_{3-8}$ carboxylic acid high copolymers, particularly ethylene (meth)acrylic acid copolymers and ethylene, alkyl (meth)acrylate, (meth)acrylic acid terpolymers, having molecular weights of about 80,000 to about 500,000 which are melt blended with ethylene/$\alpha$, $\beta$-ethylenically unsaturated $C_{3-8}$ carboxylic acid copolymers, particularly ethylene/(meth)acrylic acid copolymers having molecular weights of about 2,000 to about 30,000.

Component B can be any monomer, oligomer, or polymer, preferably having a lower weight percentage of anionic functional groups than that present in Component A in the weight ranges discussed above, and most preferably free of such functional groups. Examples of materials for use as Component B include block copolymers such as styrenic block copolymers including styrene-butadiene-styrene (SBS), styrene-ethylene-butylene-styrene, (SEBS) and styrene-ethylene/propylene-styrene (SEPS). Also included are functionalized styrenic block copolymers, including those where the block copolymer incorporates a first polymer block having an aromatic vinyl compound, a second polymer block having a conjugated diene compound and a hydroxyl group located at a block copolymer, or its hydrogenation product. Commercial examples SEPTON marketed by Kuraray Company of Kurashiki, Japan; TOPRENE by Kumho Petrochemical Co., Ltd and KRATON marketed by Kraton Polymers.

Component C is a base capable of neutralizing the acidic functional group of Component A and is a base having a metal cation. These metals are from groups IA, IB, IIA, IIB, IIIA, IIIB, IVA, IVB, VA, VB, VIIA, VIIB, VIIB and VIIIB of the periodic table. Examples of these metals include lithium, sodium, magnesium, aluminum, potassium, calcium, manganese, tungsten, titanium, iron, cobalt, nickel, hafnium, copper, zinc, barium, zirconium, and tin. Suitable metal compounds for use as a source of Component C are, for example, metal salts, preferably metal hydroxides, metal oxides, metal carbonates, or metal acetates.

The composition preferably is prepared by mixing the above materials into each other thoroughly, either by using a dispersive mixing mechanism, a distributive mixing mechanism, or a combination of these. These mixing methods are well known in the manufacture of polymer blends. As a result of this mixing, the anionic functional group of Component A is dispersed evenly throughout the mixture. Most preferably, Components A and B are melt-mixed together without Component C, with or without the premixing discussed above, to produce a melt-mixture of the two components. Then, Component C separately is mixed into the blend of Components A and B. This mixture is melt-mixed to produce the reaction product. This two-step mixing can be performed in a single process, such as, for example, an extrusion process using a proper barrel length or screw configuration, along with a multiple feeding system.

The outer cover and/or one or intermediate layers of the golf ball may also comprise one or more polyalkenamers which may be prepared by ring opening metathesis polymerization of one or more cycloalkenes in the presence of organometallic catalysts as described in U.S. Pat. Nos. 3,492,245 and 3,804,803, the entire contents of both of which are herein incorporated by reference. Examples of suitable polyalkenamer rubbers are polypentenamer rubber, polyheptenamer rubber, polyoctenamer rubber, polydecenamer rubber and polydodecenamer rubber. For further details concerning polyalkenamer rubber, see Rubber Chem. & Tech., Vol. 47, page 511-596, 1974, which is incorporated herein by reference. Polyoctenamer rubbers are commercially available from Huls AG of Marl, Germany, and through its distributor in the U.S., Creanova Inc. of Somerset, N.J., and sold under the trademark VESTENAMER®. Two grades of the VESTENAMER® trans-polyoctenamer are commercially available: VESTENAMER 8012 designates a material having a trans-content of approximately 80% (and a cis-content of 20%) with a melting point of approximately 54° C.; and VESTENAMER 6213 designates a material having a trans-content of approximately 60% (cis-content of 40%) with a melting point of approximately 30° C. Both of these polymers have a double bond at every eighth carbon atom in the ring.

The polyalkenamer rubbers used in the present invention exhibit excellent melt processability above their sharp melting temperatures and exhibit high miscibility with various rubber additives as a major component without deterioration of crystallinity which in turn facilitates injection molding. Thus, unlike synthetic rubbers typically used in golf ball preparation, polyalkenamer-based compounds can be prepared which, are injection moldable. The polyalkenamer rubbers may also be blended within other polymers and an especially preferred blend is that of a polyalkenamer and a polyamide. A more complete description of the polyalkenamer rubbers and blends with polyamides is disclosed in copending U.S. application Ser. No. 11/335,070, filed on Jan. 18, 2006, in the name of Hyun Kim et al., which issued as U.S. Pat. No. 7,528,196 on May 5, 2009, the entire contents of which are hereby incorporated by reference.

DEFINITIONS

As used herein, the singular forms "a," "an," and "the" include the corresponding plural forms unless the context clearly dictates otherwise. Additionally, the term "includes" means "comprises." Further, the term "coupled" encompasses any of various ways in which one thing is linked, mounted, or attached to, and does not exclude the presence of intermediate elements between the coupled things.

Certain terms may be used such as "up," "down,", "upper," "lower," "horizontal," "vertical," "left," "right," and the like. These terms are used, where applicable, to provide some clarity of description when dealing with relative relationships, positions, and/or orientations. But, these terms are not intended to imply absolute relationships, positions, and/or orientations. For example, with respect to an object, an "upper" surface can become a "lower" surface simply by turning the object over. Nevertheless, it is still the same object.

As used herein, "pole" means a region of a hemisphere furthest from a corresponding equator. For example, a recessed hemispherical mold cavity defines a pole in a region furthest from a parting line of the mold. A golf ball defines opposed poles in opposed regions furthest from and separated by a selected major circumference encircling the ball.

As described herein, some disclosed systems provide one or more "radial runner and gate systems" configured to generally symmetrically inject an injection material into a mold cavity. The term "radial runner and gate systems" means any channel or conveying mechanism that has a generally curved shape and that at least partially surrounds a portion of a mold cavity.

As used herein, the term "short runner" system means any runner system that extends between a valve gate adjacent a mold cavity to that mold cavity, either directly or via another runner system (such as a radial runner and gate system).

As used herein, "radial film gate" means an injection molding flow feature providing a generally radial flow channel relative to a cavity and defining an opening with a width oriented in a substantially common plane with a circumference or perimeter of the cavity. In contrast to a radial film gate, an annular film gate extends around substantially the entire circumference or perimeter. In some embodiments, radial film gates are no thicker than about 0.060 inch.

The term "(meth)acrylic acid copolymers" is intended to mean copolymers of methacrylic acid and/or acrylic acid.

The term "(meth)acrylate" is intended to mean an ester of methacrylic acid and/or acrylic acid.

The term "partially neutralized" is intended to mean an ionomer with a degree of neutralization of less than 100 percent.

The term "hydrocarbyl" is intended to mean any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

As used herein, the term "core" is intended to mean the elastic center of a golf ball. The core may have one or more "core layers" of elastic material, which are usually made of rubbery material such as diene rubbers.

The term "cover layer" is intended to mean the outermost layer of the golf ball; this is the layer that is directly in contact with paint and/or ink on the surface of the golf ball. If the cover consists of two or more layers, only the outermost layer is designated the cover layer, and the remaining layers (excluding the outermost layer) are commonly designated intermediate layers as herein defined. The term "outer cover layer" as used herein is used interchangeably with the term "cover layer."

The term "intermediate layer" may be used interchangeably herein with the terms "mantle layer" or "inner cover layer" and is intended to mean any layer(s) in a golf ball disposed between the core and the outer cover layer. Should a ball have more than one intermediate layer, these may be distinguished as "inner intermediate" or "inner mantle" layers which are used interchangeably to refer to the intermediate layer nearer the core and further from the outer cover, as opposed to the "outer intermediate" or "outer mantle layer" which are also used interchangeably to refer to the intermediate layer further from the core and closer to the outer cover.

The term "prepolymer" as used herein is intended to mean any material that can be further processed to form a final polymer material of a manufactured golf ball, such as, by way of example and not limitation, a polymerized or partially polymerized material that can undergo additional processing, such as crosslinking.

A "thermoplastic" as used herein is intended to mean a material that is capable of softening or melting when heated and of hardening again when cooled. Thermoplastic polymer chains often are not cross-linked or are lightly crosslinked using a chain extender, but the term "thermoplastic" as used herein may refer to materials that initially act as thermoplastics, such as during an initial extrusion process or injection molding process, but which also may be crosslinked, such as during a compression molding step to form a final structure.

A "thermoset" as used herein is intended to mean a material that crosslinks or cures via interaction with as crosslinking or curing agent. Crosslinking may be induced by energy, such as heat (generally above 200° C.), through a chemical reaction (by reaction with a curing agent), or by irradiation. The resulting composition remains rigid when set, and does not soften with heating. Thermosets have this property because the long-chain polymer molecules cross-link with each other to give a rigid structure. A thermoset material cannot be melted and re-molded after it is cured. Thus thermosets do not lend themselves to recycling unlike thermoplastics, which can be melted and re-molded.

The term "thermoplastic polyurethane" as used herein is intended to mean a material prepared by reaction of a prepared by reaction of a diisocyanate with a polyol, and optionally addition of a chain extender.

The term "thermoplastic polyurea" as used herein is intended to mean a material prepared by reaction of a prepared by reaction of a diisocyanate with a polyamine, with optionally addition of a chain extender.

The term "thermoset polyurethane" as used herein is intended to mean a material prepared by reaction of a diisocyanate with a polyol, and a curing agent.

The term "thermoset polyurea" as used herein is intended to mean a material prepared by reaction of a diisocyanate with a polyamine, and a curing agent.

A "urethane prepolymer" as used herein is intended to mean the reaction product of diisocyanate and a polyol.

A "urea prepolymer" as used herein is intended to mean the reaction product of a diisocyanate and a polyamine.

The term "bimodal polymer" refers to a polymer comprising two main fractions and more specifically to the form of the polymers molecular weight distribution curve, i.e., the appearance of the graph of the polymer weight fraction as function of its molecular weight. When the molecular weight distribution curves from these fractions are superimposed into the molecular weight distribution curve for the total resulting polymer product, that curve will show two maxima or at least be distinctly broadened in comparison with the curves for the individual fractions. Such a polymer product is called bimodal. It is to be noted here that also the chemical compositions of the two fractions may be different.

Similarly the term "unimodal polymer" refers to a polymer comprising one main fraction and more specifically to the form of the polymers molecular weight distribution curve, i.e., the molecular weight distribution curve for the total polymer product shows only a single maximum.

In view of the many possible embodiments to which the principles of the present disclosure can be applied, it should be recognized that the illustrated embodiments are only examples and should not be taken as limiting the scope of the following claims. We therefore claim all that comes within the scope and spirit of these claims.

We claim:

1. An injection mold for manufacturing golf balls, comprising:
   a first substantially spherical cavity region,
   a first radial runner and gate system that at least partially surrounds a circumference of the first spherical cavity region; and
   a first short runner extending directly from a first valve gate to the first radial runner and gate system, the first short runner having a length of less than 0.5 inches defined by a distance between the first valve gate and the first radial runner and gate system,
   wherein the first valve gate is positioned between a source of viscous polymer and the first short runner, such that a molded construct formed by the injection mold terminates at the first valve gate.

2. The mold of claim 1, wherein the first radial runner and gate system comprises a first radial runner that extends substantially around the circumference of the first spherical cavity region, and one or more first radial gates connecting the first radial runner with the first spherical cavity region.

3. The mold of claim 2, wherein the one or more first radial gates comprise at least four first radial gates spaced apart from one another in a generally uniform manner.

4. The mold of claim 1, further comprising:
   a second substantially spherical cavity region,
   a second radial runner and gate system that at least partially surrounds a circumference of the second spherical cavity region; and
   a second short runner extending from the first valve gate to the second radial runner and gate system, the second short runner having a length of less than 0.5 inches defined by a distance between the first valve gate and the second radial runner and gate system,
   wherein the first and second cavity regions, and the first and second radial runner and gate systems, form a first pair of mold cavity systems that are configured to receive injection materials from the first valve gate.

5. The mold of claim 4, wherein the first and second short runners are generally collinear.

6. The mold of claim 5, wherein the valve gate is centrally located between the first and second cavity regions.

7. The mold of claim 4, further comprising:
   a second pair of mold cavity systems, the second pair of mold cavity systems including third and fourth substantially spherical cavity regions, third and fourth radial runner and gate systems that at least partially surrounds respective circumference of the third and fourth spherical cavity regions, and third and fourth short runners extending from a second valve gate to the respective third and fourth radial runner and gate system, the third and fourth short runners having a length of less than 0.5 inches defined by a distance between the second valve gate and the third and fourth radial runner and gate systems.

8. An injection mold for forming a layer on a plurality of golf ball constructs, the mold comprising:
   a plurality of pairs of mold cavities, each pair of mold cavities being configured to receive viscous polymer from a gate member positioned between respective pairs of mold cavities;
   a plurality of short runners fluidly connecting each gate member directly with its respective pair of mold cavities, respective pairs of short runners being generally collinear and terminating at their respective gate member to restrict formation of molded construct beyond the gate member; and
   a plurality of radial runner and gate systems, each short runner being fluidly connected to a radial runner and gate system,
   wherein each gate member is located between its respective pairs of mold cavities.

9. The mold of claim 8, wherein each short runner extends from its respective gate member to its respective radial runner and gate system, each short runner having a length of less than 0.5 inches defined by a distance between the respective gate member and the respective radial runner and gate system.

10. The mold of claim 8, wherein each radial runner and gate system comprises a radial runner that at least partially surrounds a circumference of its respective mold cavity.

11. The mold of claim 8, wherein each radial runner and gate system comprises a plurality of radial gates that are spaced apart from one another in a generally uniform manner.

* * * * *